(12) United States Patent
Ashraf et al.

(10) Patent No.: US 10,144,466 B2
(45) Date of Patent: Dec. 4, 2018

(54) LOW STRESS VEHICLE FRAME MANUFACTURING PROCESS

(71) Applicant: Faraday&Future Inc., Gardena, CA (US)

(72) Inventors: Umran Ashraf, San Diego, CA (US); Felix Scheile, Redondo Beach, CA (US); John Michael Colt, Redondo Beach, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 216 days.

(21) Appl. No.: 15/190,120

(22) Filed: Jun. 22, 2016

(65) Prior Publication Data

US 2017/0369112 A1 Dec. 28, 2017

(51) Int. Cl.
*B62D 65/02* (2006.01)
*B62D 24/00* (2006.01)

(52) U.S. Cl.
CPC ........... *B62D 65/024* (2013.01); *B62D 24/00* (2013.01)

(58) Field of Classification Search
CPC .............................. B62D 65/024; B62D 21/09
USPC ......... 296/191, 203.01, 35.1, 181.1, 204, 29
See application file for complete search history.

(56) References Cited

U.S. PATENT DOCUMENTS

| | | | | | |
|---|---|---|---|---|---|
| 5,642,563 | A | * | 7/1997 | Bonnett | B62D 27/026 269/37 |
| 5,799,930 | A | * | 9/1998 | Willett | B62D 24/02 267/141.4 |
| 6,669,422 | B1 | * | 12/2003 | Sterle | F16B 5/0233 411/178 |
| 6,813,818 | B2 | * | 11/2004 | Schmidt | B21D 26/14 219/611 |
| 6,896,319 | B1 | * | 5/2005 | Huang | B62D 21/12 296/193.04 |
| 9,657,807 | B2 | * | 5/2017 | Morris | F16F 15/08 |
| 9,758,028 | B2 | * | 9/2017 | Ikeda | B60K 1/04 |
| 2012/0119543 | A1 | * | 5/2012 | Stedman | B62D 25/085 296/193.04 |
| 2017/0001667 | A1 | * | 1/2017 | Ashraf | B60K 1/04 |

* cited by examiner

*Primary Examiner* — Jason S Morrow
*Assistant Examiner* — E Turner Hicks
(74) *Attorney, Agent, or Firm* — Morrison & Foerster LLP

(57) ABSTRACT

A method for manufacturing a vehicle frame is disclosed. An upper body of the vehicle frame is formed, the upper body configured to be joined with an underbody of the vehicle frame at a first component of the upper body. The underbody of the vehicle frame is formed, the underbody configured to be joined with the upper body at a first component of the underbody. After forming the upper body and the underbody, a point on the upper body is aligned with a desired position for the point, independent of an alignment between the first component of the upper body and the first component of the underbody. After aligning the point on the upper body with the desired position for the point, the first component of the upper body is joined to the first component of the underbody.

14 Claims, 5 Drawing Sheets

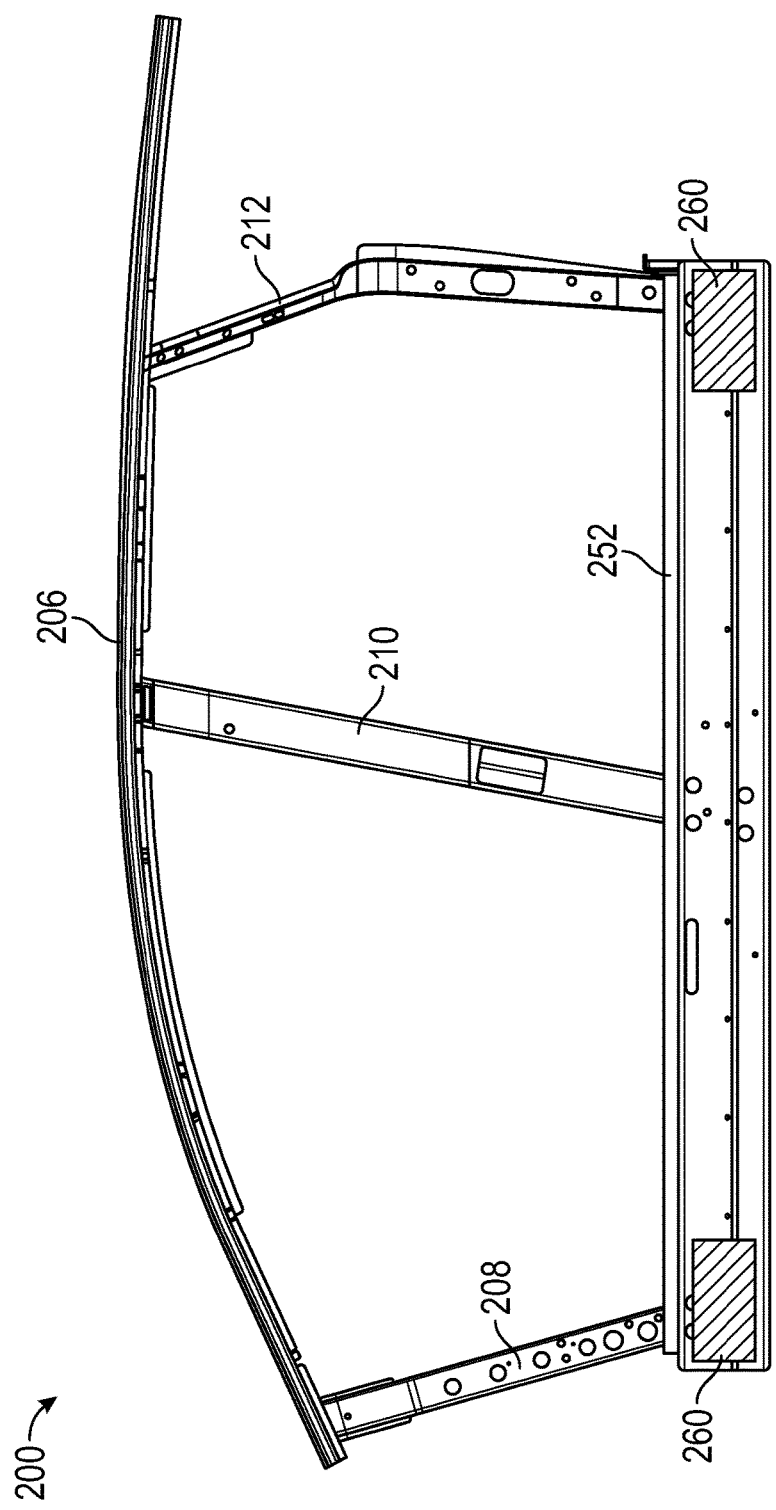

LOW STRESS VEHICLE FRAME MANUFACTURING PROCESS

FIELD OF THE DISCLOSURE

This relates generally to manufacture of a vehicle frame, and more particularly to a process of joining a vehicle upper body to its underbody with low stress.

BACKGROUND OF THE DISCLOSURE

Vehicle frames can be manufactured by separately manufacturing, and subsequently joining, an upper body and an underbody. However, due to manufacturing tolerances, manufacturing vehicle frames in this way can lead to misalignment of various features of the upper body and the underbody, correction of which can introduce stresses into the vehicle frame. Therefore, there exists a need for an improved vehicle frame manufacturing process.

SUMMARY OF THE DISCLOSURE

The examples of the disclosure are directed to a low stress vehicle frame manufacturing process. Without the processes of the disclosure, joining an upper body to an underbody, as is done in body-on-frame vehicle designs, using a bracket or joint can cause many or all frame dimensions to be constrained, which can significantly reduce the robustness of the resulting vehicle frame.

BRIEF DESCRIPTION OF THE DRAWINGS

FIG. 2 illustrates a right side of an exemplary upper body according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Vehicle frames can be manufactured by separately manufacturing, and subsequently joining, an upper body and an underbody. However, due to manufacturing tolerances, manufacturing vehicle frames in this way can lead to misalignment of various features of the upper body and the underbody, correction of which can introduce stresses into the vehicle frame. The examples of the disclosure are directed to a low stress vehicle frame manufacturing process. Without the processes of the disclosure, joining an upper body to an underbody, as is done in body-on-frame vehicle designs, using a bracket or joint can cause many or all frame dimensions to be constrained, which can significantly reduce the robustness of the resulting vehicle frame.

Figure 1A:
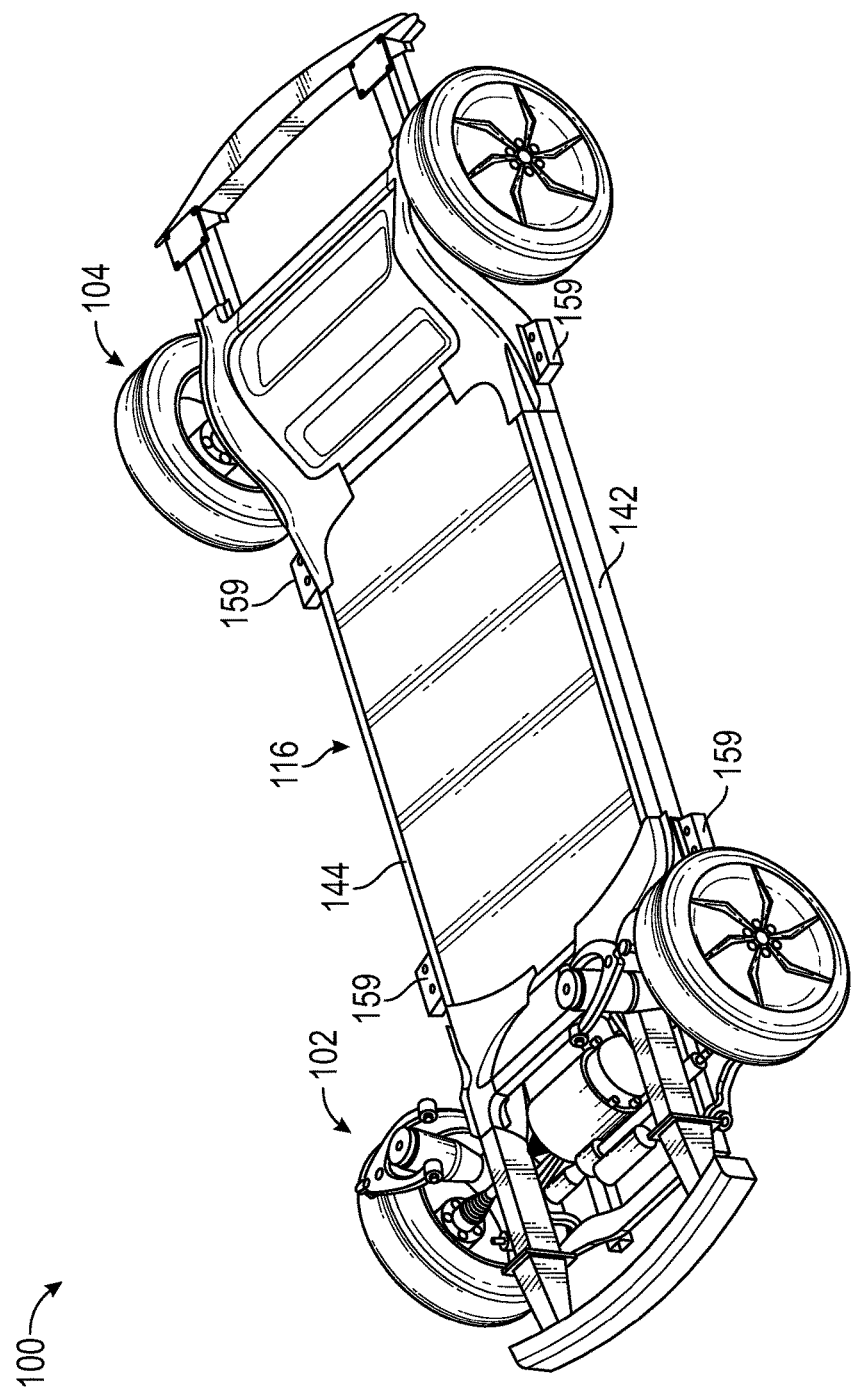
FIG. 1A illustrates a perspective view of an example underbody of a vehicle according to examples of the disclosure.

FIG. 1A illustrates a perspective view of an example underbody 100 of a vehicle according to examples of the disclosure. Underbody 100 can include a front end 102 and a rear end 104, as well as other components not explicitly described here. The front end 102 and the rear end 104 can be separated from one another by a middle section 116. The middle section 116 can include a left center frame section (e.g., left center frame rail) 142 and a right center frame section (e.g., right center frame rail) 144. The underbody 100 can be constructed from various materials (e.g., aluminum and steel) or a single material (e.g., aluminum, steel, etc.).

Underbody 100 can be configured to cooperate with an upper body (not illustrated in FIG. 1A), as will be described in greater detail below. Specifically, in a body-on-frame vehicle design, as is described in this disclosure, a frame (e.g., underbody 100) can be coupled with the engine, drivetrain, portions of the vehicle's suspension system, and wheels of the vehicle. The remaining portions of the vehicle, which can be referred to as the upper body, can be joined to the frame (e.g., underbody 100). Safety, comfort, and aesthetic components of the vehicle, such as seats, can be found in the upper body. To facilitate joining of underbody 100 to the upper body of the vehicle, the underbody can include one or more mounting joints 159 to which the upper body can be mounted. For example, as illustrated in FIG. 1A, left center frame section 142 can include a first mounting joint 159 towards front end 102, and a second mounting joint 159 towards rear end 104. Similarly, right center frame section 144 can include a first mounting joint 159 towards front end 102, and a second mounting joint 159 towards rear end 104.

Figure 1B:
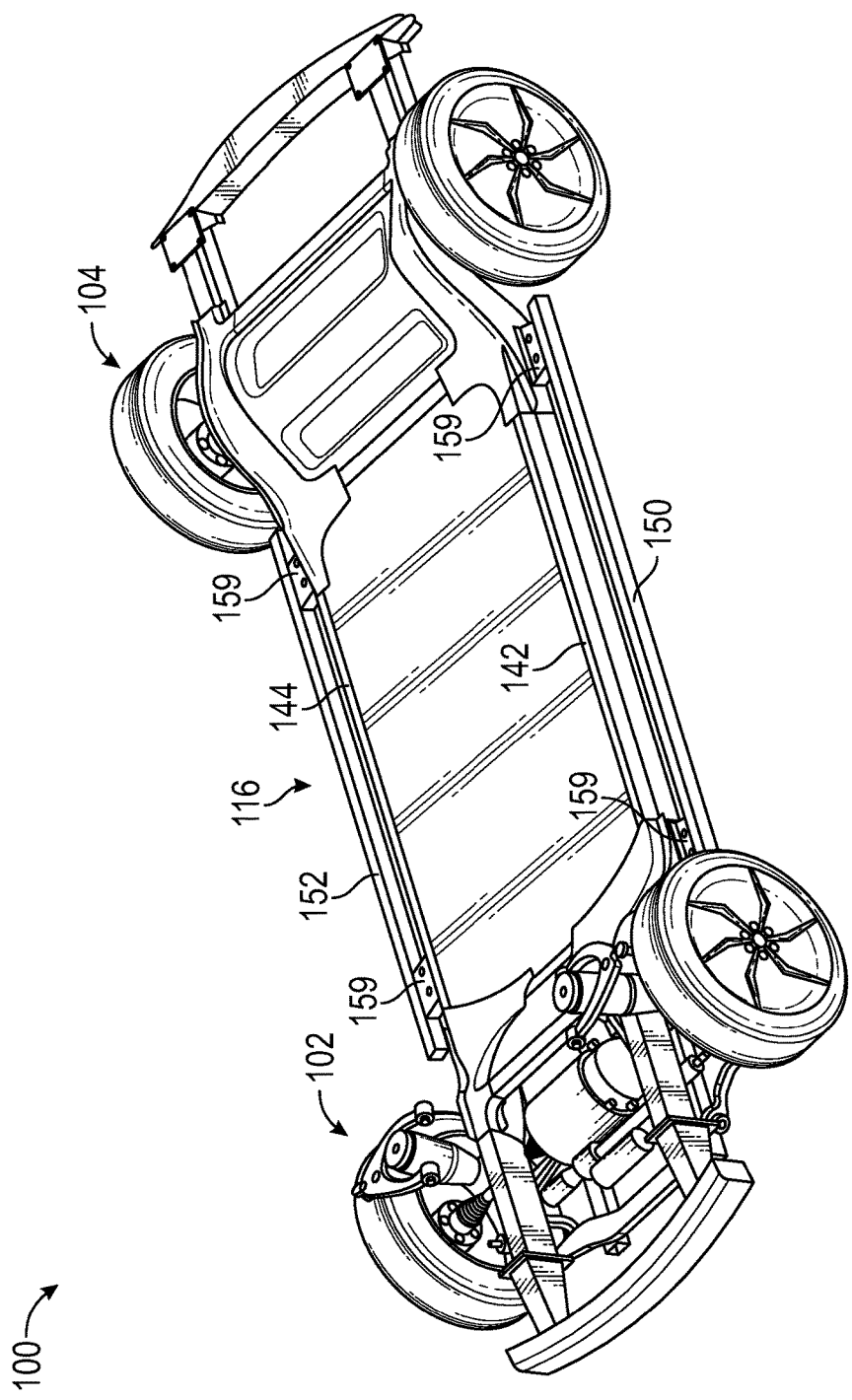
FIG. 1B illustrates an underbody joined to the side sills of an upper body according to examples of the disclosure.

The upper body to which underbody 100 is configured to be joined can be built on side sills that can be mounted to mounting joints 159. FIG. 1B illustrates underbody 100 joined to side sills 150 and 152 of an upper body according to examples of the disclosure. As mentioned above, side sills 150 and 152 can support the vehicle upper body, which is not illustrated for clarity. Side sill 150 can be a left side sill of the upper body, and side sill 152 can be a right side sill of the upper body. Left side sill 150 can be joined to left center frame section 142 at mounting joints 159, and right side sill 152 can be joined to right center frame section 144 at mounting joints 159. Once the upper body is mounted to underbody 100 via side sills 150 and 152, as described above, a vehicle frame including the under and upper structure of the vehicle can be complete.

FIG. 2 illustrates a right side of an exemplary upper body 200 according to examples of the disclosure. The view of upper body 200 in FIG. 2 can correspond to a view from inside the upper body towards the right side of the upper body (e.g., the front of the vehicle can be positioned toward the left side of FIG. 2, and the rear of the vehicle can be positioned toward the right side of FIG. 2). Upper body 200 can analogously have a left side, the details of which can be analogous to the details described here with reference to FIG. 2. Upper body 200 can be built on right side sill 252, which can correspond to right side sill 152 in FIG. 1B. In some examples, upper body 200 can include roof beam or rail 206 structurally connected to right side sill 252 by A-pillar 208 (at the front end of the upper body), B-pillar 210 (at the center of the upper body) and C-pillar 212 (at the rear end of the upper body). A-pillar 208, B-pillar 210 and C-pillar 212 can be sandwiched by respective stampings further coupled to right side sill 252 and/or roof beam 206 to structurally connect the A-pillar, B-pillar and C-pillar to the right side sill and the roof beam, for example. Upper body 200 can include additional or alternative components, which are not illustrated in FIG. 2 for ease of description.

The inside of right side sill 252 (the side of the right side sill that is illustrated in FIG. 2) can include one or more mounting brackets 260 for mounting right side sill 252 to underbody 100 at mounting joints 159, as previously described. For example, the inside of right side sill 252 can include a first mounting bracket 260 at the front end of the right side sill (e.g., to be fastened to the first mounting joint 159 on right center frame section 144 towards front end 102 of underbody 100), and a second mounting bracket 260 at the rear end of the right side sill (e.g., to be fastened to the second mounting joint 159 on right center frame section 144 towards rear end 104 of underbody 100). Once joined in this way, upper body 200 and underbody 100 can form a complete vehicle frame.

As previously mentioned, in some examples, underbody 100 and upper body 200 can be manufactured separately, and then joined together to form a complete vehicle frame during vehicle production. Further, in some examples, mounting joints 159 on underbody 100, and mounting brackets 260 on upper body 200, can be located at fixed positions on the underbody and the upper body, respectively, to be joined together as described above. However, in some cases, due to manufacturing tolerances, alignment mismatches between upper body 200 components and underbody 100 components may exist. Specifically, one or more of right side sill 252, A-pillar 208, B-pillar 210, C-pillar 212, roof beam 206, the stampings joined to or surrounding the above, and other components of upper body 200 (e.g., wheel well components) can be slightly misaligned with respect to each other. Further, one or more components of underbody 100 can be slightly misaligned with respect to each other. Thus, when upper body 200 is joined to underbody 100 (e.g., when right side sill 252 and the corresponding left side sill of the upper body are aligned with right center frame section 144 and left center frame section 142, respectively, of the underbody, and subsequently joined to right center frame section 144 and left center frame section 142, respectively), one or more components of the upper body may not be aligned with one or more components of the underbody. As a result, various ones of these components may need to be deflected, stretched, bent, or otherwise manipulated to bring these components into proper alignment, which can introduce various stresses into the vehicle's frame. Such stresses can be undesirable, as they can introduce weak points into the vehicle frame that can fail in various circumstances (e.g., under load).

Therefore, instead of mounting brackets 260 having predetermined positions on upper body 200 (e.g., on right side sill 252 and/or on the left side sill of the upper body), the positions of the mounting brackets on the upper body can be determined at the time in the vehicle manufacturing process when the upper body and the underbody are joined. Specifically, prior to joining upper body 200 to underbody 100, one or more components on the upper body can be aligned with respect to one or more components of the underbody, as desired. Once those upper body 200 components have been aligned with desired positions (e.g., with respect to one or more components on underbody 100), mounting brackets 260 can be positioned on, and affixed to, upper body 200 so as to match up with mounting joints 159 on underbody 100. In this way, stresses that may have been introduced into the vehicle frame to align such upper body 200 components can be avoided.

Figure 3A:
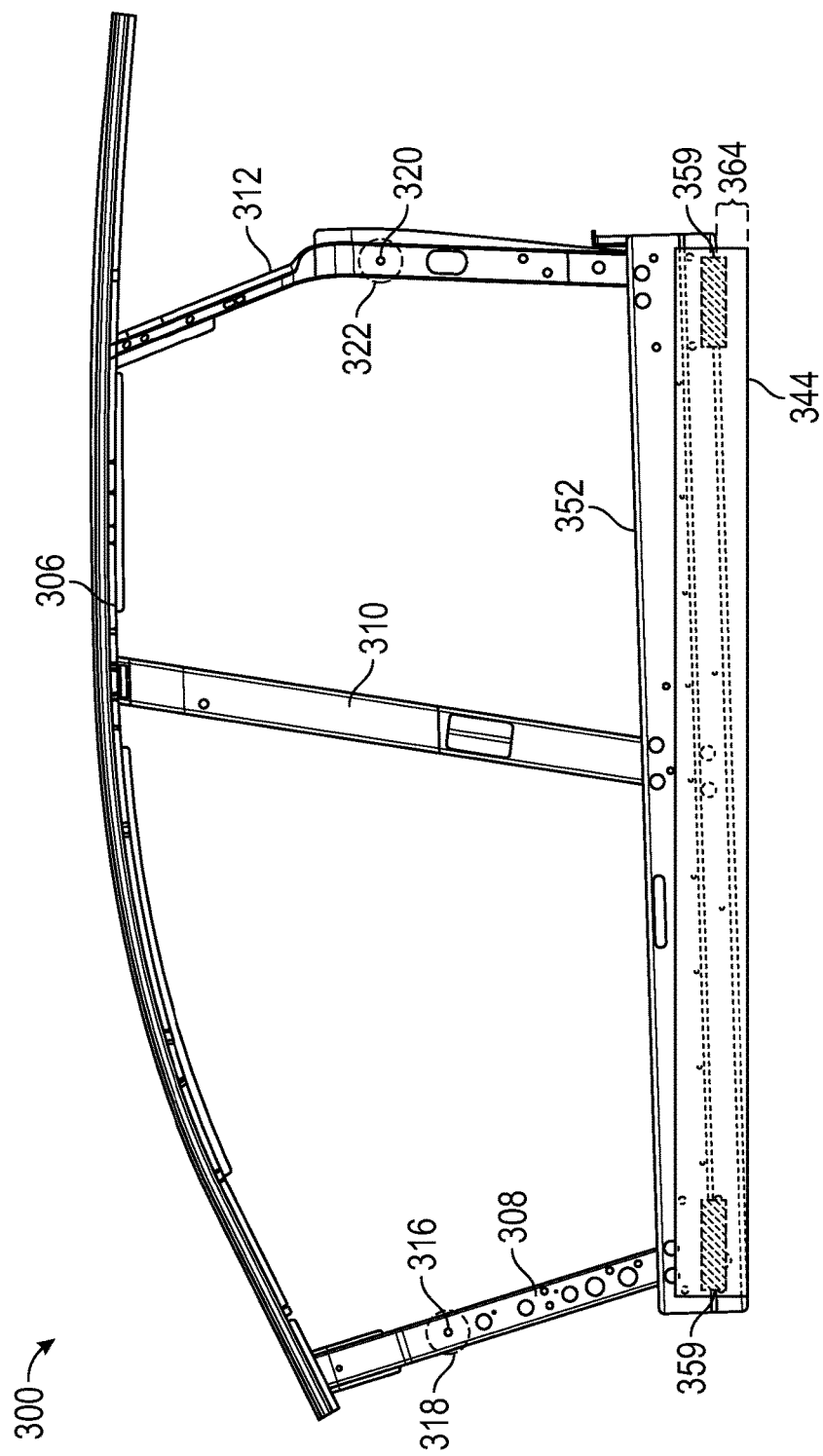
FIGS. 3A-3B illustrate an exemplary low stress vehicle frame manufacturing process according to examples of the disclosure.
Figure 3B:
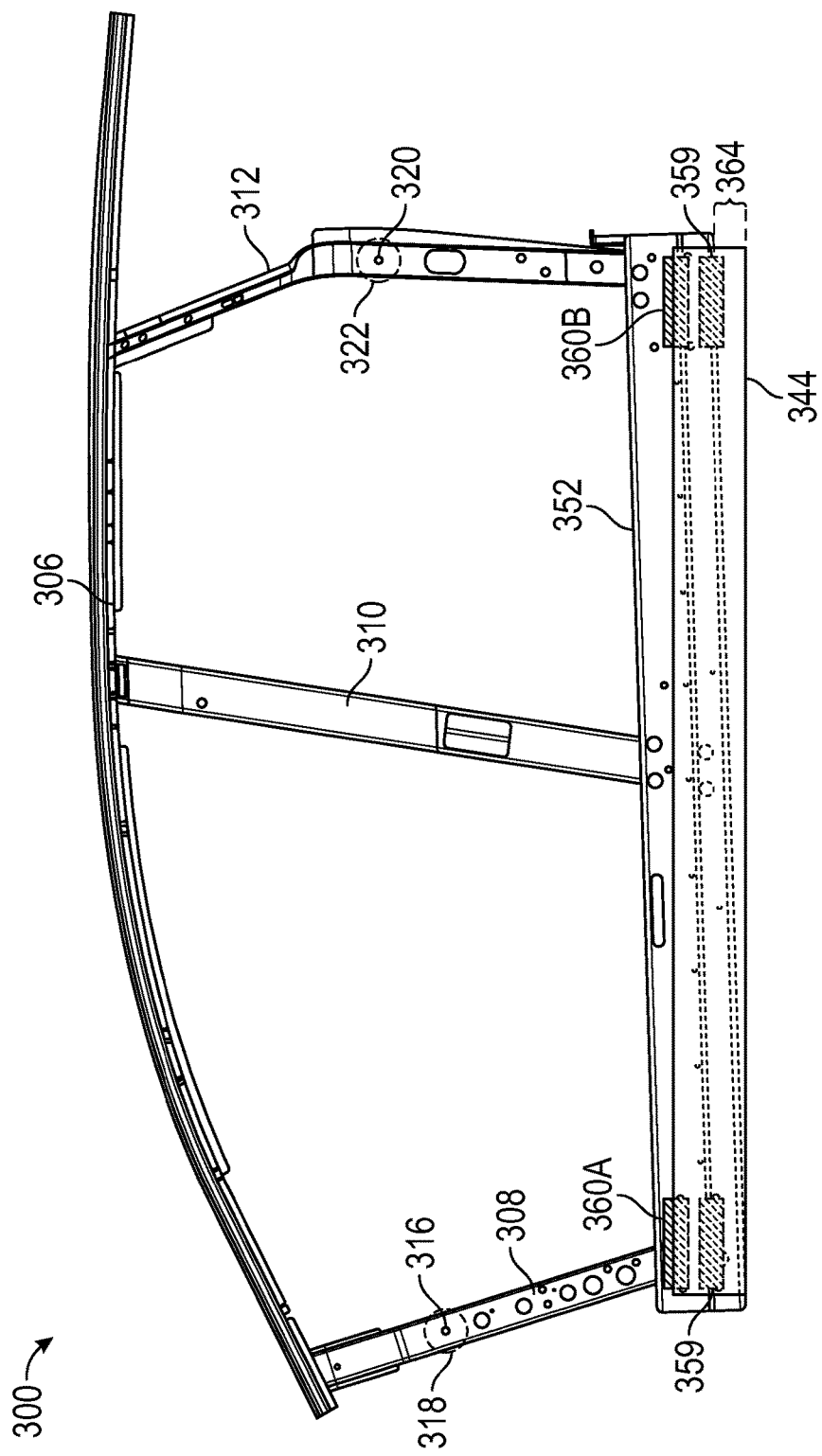

FIGS. 3A-3B illustrate an exemplary low stress vehicle frame manufacturing process according to examples of the disclosure. In FIG. 3A, upper body 300 and the underbody (e.g., underbody 100) have optionally been separately assembled, as described above. Now, upper body 300 and the underbody (e.g., right center frame section 344 of which is illustrated in FIG. 3A) are optionally being joined in the vehicle frame manufacturing process. FIG. 3A illustrates right center frame section 344 overlaid over upper body 300, as might be performed when aligning right center frame section 344 with upper body 300 in manufacturing the vehicle frame. Upper body 300 can correspond to upper body 200 described above, and can include A-pillar 308, B-pillar 310 and C-pillar 312, all structurally connected between roof beam 306 and right side sill 352. Right center frame section 344 can correspond to right center frame section 144 of underbody 100 described in FIGS. 1A-1B, with the remainder of the underbody not illustrated for ease of description. Right center frame section 344 can include mounting joints 359, which can be fixedly formed in, or joined to, right center frame section 344 as part of the assembly of underbody 100, as previously described. Right side sill 352, however, may not yet include mounting brackets to be mounted to mounting joints 359.

In FIG. 3A, one or more points on upper body 300 can be aligned to desired positions. These desired positions can be with respect to one or more points on the underbody (e.g., the one or more points on the upper body can be aligned with respect to one or more points on the underbody), though in some examples, these desired positions can be with respect to any arbitrary points. For example, in FIG. 3A, point 316 on A-pillar 308 can be aligned to position 318, and point 320 on C-pillar 312 can be aligned to position 322. Points 316 and 320 can correspond to points on wheel wells on upper body 300, which can be aligned with respect to one or more suspension components on the underbody, the desired alignment positions for which being represented by positions 318 and 322, for example. Points 316 and 320 are illustrated by way of example only, and it is understood that different points can be aligned to respective positions in accordance with the examples of the disclosure. Due to manufacturing tolerances, as described previously, as a result of aligning points 316 and 320 to positions 318 and 322, respectively, right side sill 352 may be misaligned with right center frame section 344, as shown by offset 364. The low stress manufacturing process of this disclosure can be designed to manage such misalignment, as will be shown in FIG. 3B.

FIG. 3B illustrates the placement and fastening of mounting brackets 360 on right side sill 352 according to examples of the disclosure. Specifically, after aligning one or more points on upper body 300 to desired positions, as described with reference to FIG. 3A, mounting brackets 360A (e.g., front mounting bracket) and 360B (e.g., rear mounting bracket) can be placed on, and fastened to (e.g., with nails, with screws, etc.), right side sill 352 at locations corresponding to the locations of mounting joints 359 resulting from the alignment of the upper body performed in FIG. 3A. Due to the misalignment of right side sill 352 and right center frame section 344, the relative locations of front mounting bracket 360A and rear mounting bracket 360B on right side sill 352 (e.g., the vertical and or lateral relative locations on the right side sill) can be different. For example, mounting bracket 360A can be fastened to a position on right side sill 352 that is higher (e.g., relative to a reference axis on the right side sill) than the position on right side sill 352 to which mounting bracket 360B is fastened. Once mounting brackets 360A and 360B are affixed to right side sill 352, they can be joined with mounting joints 359 (e.g., with nails, with screws, with bolts, etc.) on right center frame section 344 to join upper body 300 to the underbody to form the vehicle frame. As a result of the frame manufacturing process described with reference to FIGS. 3A-3B, the vehicle frame can be constructed in which one or more points on upper body 300 (e.g., points 316 and 320) can be aligned to desired positions despite misalignment between other components of the vehicle frame (e.g., misalignment 364 between right side sill 352 and right center frame section 344) without the need to stress portions of the vehicle frame to achieve the desired alignment. As such, a low stress vehicle frame can be constructed.

It is understood that while the examples of the disclosure have been described in the context of fixed-location mounting joints on the underbody, and variable-location mounting brackets on the upper body, the teachings of the disclosure analogously extend to vehicle manufacturing processes in which: 1) the mounting brackets have fixed locations on the upper body, and the mounting joints have variable locations on the underbody; or 2) the mounting brackets on the upper body and the mounting joints on the underbody both have variable locations. Such vehicle manufacturing processes can implement the teachings of this disclosure in manners analogous to those described above.

Thus, the examples of the disclosure provide a low stress vehicle frame manufacturing process.

Therefore, according to the above, some examples of the disclosure are directed to a method for manufacturing a vehicle frame, the method comprising: forming an upper body of the vehicle frame, the upper body configured to be joined with an underbody of the vehicle frame at a first component of the upper body; forming the underbody of the vehicle frame, the underbody configured to be joined with the upper body at a first component of the underbody; after forming the upper body and the underbody, aligning a point on the upper body with a desired position for the point, independent of an alignment between the first component of the upper body and the first component of the underbody; and after aligning the point on the upper body with the desired position for the point, joining the first component of the upper body to the first component of the underbody. Additionally or alternatively to one or more of the examples disclosed above, in some examples, after aligning the point on the upper body with the desired position for the point, the first component of the upper body is misaligned with the first component of the underbody, and the first component of the upper body and the first component of the underbody are joined while the first component of the upper body and the first component of the underbody are misaligned. Additionally or alternatively to one or more of the examples disclosed above, in some examples, the point on the upper body is on a second component of the upper body, different from the first component of the upper body. Additionally or alternatively to one or more of the examples disclosed above, in some examples, the second component of the upper body comprises one or more of an A-pillar, a B-pillar and a C-pillar. Additionally or alternatively to one or more of the examples disclosed above, in some examples, the second component of the upper body comprises a vehicle wheel well. Additionally or alternatively to one or more of the examples disclosed above, in some examples, the desired position for the point on the upper body is with respect to a component of the underbody, other than the first component of the underbody. Additionally or alternatively to one or more of the examples disclosed above, in some examples, the component of the underbody is a suspension component. Additionally or alternatively to one or more of the examples disclosed above, in some examples, the first component of the upper body comprises a side sill of the upper body. Additionally or alternatively to one or more of the examples disclosed above, in some examples, the first component of the underbody comprises a frame rail of the underbody. Additionally or alternatively to one or more of the examples disclosed above, in some examples, joining the first component of the upper body to the first component of the underbody comprises joining the first component of the upper body to the first component of the underbody using one or more mounting brackets. Additionally or alternatively to one or more of the examples disclosed above, in some examples, joining the first component of the upper body to the first component of the underbody comprises: after aligning the point on the upper body with the desired position for the point, determining one or more locations for the one or more mounting brackets on the first component of the upper body; affixing the one or more mounting brackets to the one or more locations on the first component of the upper body; and joining the one or more mounting brackets to the first component of the underbody. Additionally or alternatively to one or more of the examples disclosed above, in some examples, joining the one or more mounting brackets to the first component of the underbody comprises joining the one or more mounting brackets to one or more mounting joints on the first component of the underbody, wherein the one or more mounting joints are fixedly formed on the first component of the underbody before the point on the upper body is aligned with the desired position for the point. Additionally or alternatively to one or more of the examples disclosed above, in some examples, the one or more mounting brackets comprise a first mounting bracket and a second mounting bracket, and the first mounting bracket and the second mounting bracket are affixed to different relative vertical locations on the first component of the upper body. Additionally or alternatively to one or more of the examples disclosed above, in some examples, the method further comprises: after forming the upper body and the underbody, aligning a second point on the upper body with a desired position for the second point, independent of the alignment between the first component of the upper body and the first component of the underbody, wherein joining the first component of the upper body to the first component of the underbody is after aligning the point on the upper body with the desired position for the point and aligning the second point on the upper body with the desired position for the second point.

Some examples of the disclosure are directed to a vehicle frame comprising: an upper body joined with an underbody of the vehicle frame at a first component of the upper body; and the underbody joined with the upper body at a first component of the underbody, wherein the first component of the upper body is joined to the first component of the underbody independent of an alignment between the first component of the upper body and the first component of the underbody.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A method for manufacturing a vehicle frame, the method comprising:
forming an upper body of the vehicle frame, the upper body configured to be joined with an underbody of the vehicle frame at a first component of the upper body;

forming the underbody of the vehicle frame, the underbody configured to be joined with the upper body at a first component of the underbody;

after forming the upper body and the underbody, aligning a point on the upper body with a desired position for the point, independent of an alignment between the first component of the upper body and the first component of the underbody; and after aligning the point on the upper body with the desired position for the point, joining the first component of the upper body to the first component of the underbody, wherein the desired position of the point on the upper body is with respect to a component of the underbody, other than the first component of the underbody.

2. The method of claim 1, wherein after aligning the point on the upper body with the desired position for the point, the first component of the upper body is misaligned with the first component of the underbody, and the first component of the upper body and the first component of the underbody are joined while the first component of the upper body and the first component of the underbody are misaligned.

3. The method of claim 1, wherein the point on the upper body is on a second component of the upper body, different from the first component of the upper body.

4. The method of claim 3, wherein the second component of the upper body comprises one or more of an A-pillar, a B-pillar and a C-pillar.

5. The method of claim 3, wherein the second component of the upper body comprises a vehicle wheel well.

6. The method of claim 1, wherein the component of the underbody is a suspension component.

7. The method of claim 1, wherein the first component of the upper body comprises a side sill of the upper body.

8. The method of claim 1, wherein the first component of the underbody comprises a frame rail of the underbody.

9. A method for manufacturing a vehicle frame, the method comprising:

forming an upper body of the vehicle frame, the upper body configured to be joined with an underbody of the vehicle frame at a first component of the upper body;

forming the underbody of the vehicle frame, the underbody configured to be joined with the upper body at a first component of the underbody;

after forming the upper body and the underbody, aligning a point on the upper body with a desired position for the point, independent of an alignment between the first component of the upper body and the first component of the underbody; and after aligning the point on the upper body with the desired position for the point, joining the first component of the upper body to the first component of the underbody, wherein joining the first component of the upper body to the first component of the underbody comprises joining the first component of the upper body to the first component of the underbody using one or more mounting brackets.

10. The method of claim 9, wherein joining the first component of the upper body to the first component of the underbody comprises:

after aligning the point on the upper body with the desired position for the point, determining one or more locations for the one or more mounting brackets on the first component of the upper body;

affixing the one or more mounting brackets to the one or more locations on the first component of the upper body; and joining the one or more mounting brackets to the first component of the underbody.

11. The method of claim 10, wherein joining the one or more mounting brackets to the first component of the underbody comprises joining the one or more mounting brackets to one or more mounting joints on the first component of the underbody, wherein the one or more mounting joints are fixedly formed on the first component of the underbody before the point on the upper body is aligned with the desired position for the point.

12. The method of claim 10, wherein the one or more mounting brackets comprise a first mounting bracket and a second mounting bracket, and the first mounting bracket and the second mounting bracket are affixed to different relative vertical locations on the first component of the upper body.

13. The method of claim 1, further comprising:

after forming the upper body and the underbody, aligning a second point on the upper body with a desired position for the second point, independent of the alignment between the first component of the upper body and the first component of the underbody, wherein joining the first component of the upper body to the first component of the underbody is after aligning the point on the upper body with the desired position for the point and aligning the second point on the upper body with the desired position for the second point.

14. The method of claim 9, further comprising:

after forming the upper body and the underbody, aligning a second point on the upper body with a desired position for the second point, independent of the alignment between the first component of the upper body and the first component of the underbody, wherein joining the first component of the upper body to the first component of the underbody is after aligning the point on the upper body with the desired position for the point and aligning the second point on the upper body with the desired position for the second point.

* * * * *